United States Patent Office 3,493,647
Patented Feb. 3, 1970

3,493,647
PRODUCTION OF POLYAMIDE MOLDINGS
Wilhelm Schuette and Bjoern Olsen, Ludwigshafen (Rhine), and Josef Zendath, Hassloch, Pfalz, Germany, assignors to Badische Anilin- & Soda-Fabrik Aktiengesellschaft, Ludwigshafen (Rhine), Germany
No Drawing. Filed June 13, 1966, Ser. No. 556,887
Claims priority, application Germany, June 18, 1965, 1,570,276
Int. Cl. B29f 3/02; B29g 2/00; B29d 7/02
U.S. Cl. 264—216                                    4 Claims

ABSTRACT OF THE DISCLOSURE

Process of producing an homogeneous polylactam molding having a ratio of height to smallest width of more than 3:1 by the activated anionic polymerization of a monomeric lactam, characterized by the introduction of the polymerizing lactam melt into a longitudinally vertically positioned mold from above while filling the mold at a rate of longitudinal growth of between 20 and 400 cm./min.

This invention relates to a method of preparing moldings of polyamides by activated anionic polymerization of lactams.

It is known that polyamide rods may be prepared continuously by pouring a polymerization mixture consisting of lactam, catalyst and activator into a mold having a constant cross-section and heated to polymerization temperature in such a way that the rod or molding being withdrawn grows by about 2 cm. per minute. Rods prepared in this way have inhomogeneities and flaws. Moreover it is not possible by means of said method to prepare moldings having a varying cross-section, for example truncated cones.

We have now found that homogenous moldings having a ratio of height to width of more than 3:1 can be advantageously prepared by activated anionic polymerization of lactams having six to twelve ring carbon atoms in a mold, when the molten polymerization mixture containing catalyst, activator and crosslinking agent is introduced into the mold in such a way that the rate of longitudinal growth is from 20 to 400 cm./minute, preferably from 30 to 300 cm./minute. Homogeneous moldings having an excellent surface are obtained.

It is surprising that above and below the said limits moldings are obtained which are irregular and inhomogeneous even when the polymerization conditions, for example the temperature, are widely varied. Thus, when production by polymerization at 100° or 160° C. is carried out outside the limits according to the invention, the moldings obtained have unsatisfactory properties. It is equally surprising that decreasing or increasing the amount of activator or catalyst (by which means, as is well known, the period which elapses before the molding is completely polymerized may be varied considerably, as is the case when varying the temperature) outside the range of rate of longitudinal growth according to the invention also does not result in homogeneous moldings. Neither is this the case when the temperature of the walls of the molding is varied or different lactams, mixtures of lactams or, in addition, crosslinking agents are used.

One of the advantages of the process according to this invention is that it is particularly economical because it does not necessitate any complicated equipment but merely requires that the rate of supply should be regulatable, namely by nozzles, dies, pumps or other generally known equipment.

The process according to this invention is suitable for the production of moldings of any cross-section and of any length, and the cross-section of one and the same molding may vary, as for example in the case of truncated cones. The process is preferably carried out continuously for the production of rods, boards or sections having a rectangular cross-section and batchwise for the production of rollers or truncated cones.

Polymerization is carried out under the conventional conditions for activated anionic polymerization of lactams, for example by halving the amount of lactom to be polymerized and dissolving a small amount of the alkaline catalyst in the melt of one half while dissolving the activator in the melt of the other half. The two solutions are kept at a temperature which is above the melting point of the lactam used but generally not above 160° C. The portions of the two melts which are intended for polymerization are then mixed and immediately passed into the mold cavity which in most cases is arranged vertically and which is closed by a closure capable of being moved downwards in the direction of take-away and thus forms the polymerization chamber.

The withdrawal of the closure and of the section being molded may be carried out by means of equipment conventionally used for the purpose. Such equipment includes threaded spindles, hydraulic pistons, draw rolls or cable traction.

The reaction mixture is polymerized under conventional conditions, i.e., at temperatures of from 90° to 250° C., preferably from 100° to 160° C., and approximately within 0.2 to 5 minutes, depending on the catalyst system chosen. Although it is not necessary when using the preferred activators, the air in the feed zone of the reaction chamber may be displaced by an indifferent gas, for example nitrogen.

Suitable lactams for the process having six to twelve ring carbon atoms are for example caprolactam, oenantholactam, capryllactam, capric lactam, laurolactam or C-substituted derivatives of these lactams, such as 3-methylcaprolactam, 4-isopropylcaprolactam. Mixtures of these lactams may also be used. The said lactams may additionally contain lactams which are connected by bridging groups, for example methylenebiscaprolactam.

Alkali metal lactamates, such as are described in German patent specification No. 1,067,587, are particularly suitable as polymerization catalysts. They are used in amounts of 0.01 to 10%, preferably 0.1 to 5%, by weight on the total amount of polyamide-forming starting materials. For special purposes however it is possible to use amounts outside these ranges. Obviously the catalysts may be used mixed together in any proportions.

Suitable activators include conventional substances, particularly substituted ureas, thioureas, isothioureas, guanidines, urethanes or amidines containing at least one organic radical. They are used in amounts of 0.05 to 10%, preferably 0.05 to 5%, by weight on the total weight of the polyamide-forming starting materials.

Molds of iron, aluminum and other metals and of polyesters with glass fibers, sand bonded with waterglass, silicone rubber and all materials which are not attacked by the hot lactam melt, are suitable.

In order to facilitate removal of the molding from the mold, the mold wall which comes into contact with the polymer may be lined with a suitable substance, such as polyfluoroethylene or silicone rubber.

The invention is illustrated by the following examples in which parts are by weight.

EXAMPLE 1

Two melts, heated to 125° C. and having the following compositions, are used for the polymerization:

(a) 498 parts of caprolactam and 2 parts of alkali metal caprolactamate;

(b) 460 parts of caprolactam and 40 parts of bis-caprolactam-N-hexamethylene-diamide-1,6,6.

The melts (a) and (b) are continuously mixed and filled into a vertical circular mold cavity having a diameter of 75 mm. and a length of 2 m. which is heated to 140° C., at such a rate that the rise in level of the melt is 120 cm./minute. The rod obtained is homogeneous in the interior over its whole length and has no streaks. The result is also good when the rate of rise of level is 108 cm./minute or 135 cm./minute. Inhomogeneous rods are always obtained when the rate of rise of level is 10 cm./minute of 500 cm./minute.

EXAMPLE 2

The polymerization mixture according to Example 1 is polymerized at 130° C. (but otherwise as described in Example 1) in molds having diameters of 75 mm. and 100 mm. and lengths of 200 cm. with a rate of rise of level of 90 cm./minute and 55 cm./minute. The rods are homogeneous in contrast to rods in which the rate of rise of level is 15 cm./minute. These are inhomogeneities.

EXAMPLE 3

For the continuous production of rods having a diameter of 70 mm., the polymerization mixture according to Example 1 is polymerized at 125° C. in an open mold cavity from which the rod formed is taken away at the bottom at a rate of 110 cm./minute. Supply of the molten polymerization mixture is controlled so that the level in the mold always remains at the same height. The rod does not exhibit any inhomogeneities over the whole cross-section.

EXAMPLE 4

In order to prepare a frusto conical molding having a height of 130 cm. and a diameter varying from 4.5 cm. to 24 cm., the polymerization mixture used in Example 1 is polymerized in a mold of appropriate shape which is heated to 140° C. The molten polymerization mixture is fed in at such a rate that the rise in level is about 50 cm./minute. Since the mold has a varying cross-sectional area, the rate of supply of the polymerization mixture must be varied in order to keep the rate of rise of level in the said range.

We claim:

1. A process for the production of an homogeneous polylactam molding having a ratio of height to smallest width of more than 3:1 by the activated anionic polymerizaiton of a molten mixture of the monomeric lactam containing a catalyst and an activator, which process comprises introducing the polymerizing lactam melt maintained at a temperautre of 90° C. to 160° C. from above into a longitudinally vertically positioned mold and filling the mold from bottom to top at a rate of longitudinal growth of between 20 and 400 cm./min.

2. A process as defined in claim 1 wherein said rate of longitudinal growth as the polymerizing lactam melt fills the mold is about 30 to 300 cm./min.

3. A process as defined in claims 1 or 2 wherein the molten polymerization mixture contains a cross-linking agent.

4. A process as claimed in claim 1 which is carried out continuously in a mold of constant cross-section, wherein the molded product is continuously withdrawn from the bottom of said mold at said rate of longitudinal growth while continuously filling the mold with fresh polymerizing lactam melt at approximately the same rate so that the level of the melt remains at about the same height within the mold during the continuous operation.

References Cited

UNITED STATES PATENTS

| | | |
|---|---|---|
| 3,018,273 | 1/1962 | Butler et al. |
| 3,294,757 | 12/1966 | Church. |
| 3,417,178 | 12/1968 | Downing et al. _____ 264—331 |

ROBERT F. WHITE, Primary Examiner

J. R. THURLOW, Assistant Examiner

U.S. Cl. X.R.

260—78; 264—165, 167, 176